US007954161B1

(12) United States Patent
Guruswamy et al.

(10) Patent No.: US 7,954,161 B1
(45) Date of Patent: May 31, 2011

(54) MECHANISM FOR CHARACTERIZING SOFT FAILURES IN SYSTEMS UNDER ATTACK

(75) Inventors: Kowsik Guruswamy, Sunnyvale, CA (US); Ajit Sancheti, Cupertino, CA (US)

(73) Assignee: MU Dynamics, Inc., Sunnyvale, CA (US)

( * ) Notice: Subject to any disclaimer, the term of this patent is extended or adjusted under 35 U.S.C. 154(b) by 965 days.

(21) Appl. No.: 11/760,600

(22) Filed: Jun. 8, 2007

(51) Int. Cl.
*G08B 23/00* (2006.01)
(52) U.S. Cl. .......................... 726/25; 726/22
(58) Field of Classification Search ............ 726/22, 726/25; 709/224; 380/1, 2
See application file for complete search history.

(56) References Cited

U.S. PATENT DOCUMENTS

| | | | |
|---|---|---|---|
| 5,459,837 A * | 10/1995 | Caccavale | 709/226 |
| 5,892,903 A | 4/1999 | Klaus | |
| 6,363,477 B1 * | 3/2002 | Fletcher et al. | 713/151 |
| 6,584,569 B2 | 6/2003 | Reshef et al. | |
| 7,509,675 B2 | 3/2009 | Aaron | |
| 2001/0034847 A1 | 10/2001 | Gaul, Jr. | |
| 2003/0154399 A1 | 8/2003 | Zuk et al. | |
| 2005/0044418 A1 | 2/2005 | Miliefsky | |
| 2006/0005231 A1 | 1/2006 | Zuk et al. | |
| 2006/0021049 A1 | 1/2006 | Cook | |
| 2007/0094728 A1 | 4/2007 | Julisch et al. | |
| 2007/0204347 A1 | 8/2007 | Caceres et al. | |

OTHER PUBLICATIONS

Bellovin, S., "A Technique for Counting NATted Hosts," Proceedings: Second Internet Measurement Workshop (IMW), Marseille, France, Nov. 6-8, 2002, pp. 267-272.

Bradner, S. et al., "Benchmarking Methodology for Network Interconnect Devices (RFC 1944)," May 1996, [online] [Retrieved on May 12, 2006] Retrieved from the Internet <URL: http://rfc.net/rfc1944.html>.
Bradner, S. et al., "Benchmarking Methodology for Network Interconnect Devices (RFC 2544)," Mar. 1999, [online] [Retrieved on May 12, 2006] Retrieved from the Internet <URL: http://rfc.net/rfc2544.html>.
Cisco Systems, Inc., "Mobile IP—NAT Detect" in "Cisco IOS IP Mobility Configuration Guide, Release 12.4," 2005, [online] [Retrieved on May 12, 2006] Retrieved from the Internet <URL: http://www.cisco.com/univercd/cc/td/doc/product/software/ios124/124cg/himo_c/ch05/hnatrav.pdf>.
Dunn, J. et al., "Methodology for ATM Benchmarking (RFC 3116)," Jun. 2001, [online] [Retrieved on May 12, 2006], Retrieved from the Internet <URL: http://rfc.net/rfc3116.html>.
Egevang, K., et al., "The IP Network Address Translator (NAT) (RFC 1631)," May 1994, [online] [Retrieved on May 12, 2006] Retrieved from the Internet <URL: http://rfc.net/rfc1631.html>.
Microsoft Corp., "Overview of Network Address Translation (NAT) in Windows XP," Sep. 12, 2005, [online] [Retrieved on May 12, 2006] Retrieved from the Internet <URL: http://www.microsoft.com/technet/prodtechnol/winxppro/deploy/nattrnsv.mspx?pf=true>.
Netcom Systems, "SmartWindow User Guide Version 6.53," Document No. 340-1020-001 REV C, Dec. 1999, [online] [Retrieved on May 12, 2006] Retrieved from the Internet <URL: http://cobra.ee.ntu.edu.tw/~oops/HTML6/08_exp/smartbit%20reading.pdf>.

(Continued)

*Primary Examiner* — Edward Zee
(74) *Attorney, Agent, or Firm* — K&L Gates LLP (57) ABSTRACT

A system and method to identify and characterize nonfatal failures of a device-under-analysis (DUA). A security analyzer executes attacks to test the security of the DUA. During the attacks, the security analyzer periodically sends an instrumentation command to the DUA and measures the time the DUA takes to successfully respond to the instrumentation command (the response time sample). The security analyzer uses the response time samples to identify and/or characterize the nonfatal failures in the DUA caused by the attacks.

27 Claims, 3 Drawing Sheets

OTHER PUBLICATIONS

Nikolic, M., "Performance Measurements of Multimedia Transmissions in IP over ATM Networks," Master's Thesis, School of Engineering Science, Simon Fraser University, Dec. 2002, [online] [Retrieved on May 12, 2006] Retrieved from the Internet <URL: http://142.58.111.30/~Ijilja/cnl/pdf/milan.pdf>.

PCT International Search Report and Written Opinion, PCT/US06/09512, Aug. 31, 2006, 7 pages.

Sorensen, S., "Intrusion Detection and Prevention: Protecting Your Network from Attacks," Document No. 200065-002, 2006, [online] [Retrieved on May 12, 2006] Retrieved from the Internet <URL: http://www.juniper.net/solutions/literature/white_papers/200065.pdf>.

Srisuresh, P. et al., "IP Network Address Translator (NAT) Terminology and Considerations (RFC 2663)," Aug. 1999, [online] [Retrieved on May 12, 2006] Retrieved from the Internet <URL: http://rfc.net/rfc2663.html>.

Srisuresh, P. et al., "Traditional IP Network Address Translator (Traditional NAT) (RFC 3022)," Jan. 2001, [online] [Retrieved on May 12, 2006] Retrieved from the Internet <URL: http://rfc.net/rfc3022.html>.

Trend Communications, "RFC 2544 Testing with Aurora Tango," date unknown, [online] [Retrieved on May 12, 2006] Retrieved from the Internet <URL: http://www.trendtest.co.uk/trendweb/resource.nsf/v1FileURLLookup/en%5E%5ERFC+2544+testing/$FILE/GbEnet.2544.test.pdf>.

Udupa, R. et al., "Performance Issues and Evaluation Techniques for Networking Devices," 2001, [online] [Retrieved on May 12, 2006] Retrieved from the Internet <URL: http://softwaredioxide.com/Channels/events/testing2001/Presentations/raghavendra_infosys.pdf>.

* cited by examiner

MECHANISM FOR CHARACTERIZING SOFT FAILURES IN SYSTEMS UNDER ATTACK

CROSS-REFERENCE TO RELATED APPLICATIONS

The present invention is related to U.S. Utility patent application Ser. No. 11/514,809, filed on Sep. 1, 2006, U.S. Utility patent application Ser. No. 11/351,402, filed on Feb. 10, 2006, and U.S. Utility patent application Ser. No. 11/351,403, filed on Feb. 10, 2006, all are hereby incorporated by reference in their entirety.

BACKGROUND

The present invention relates to automated security analysis of hardware and/or software.

Systems with network capability and software running on such systems are vulnerable to various network attacks. If a system is expected to provide services that meet a certain quality standard, it should continue to provide services that meet this standard despite network-based attacks. For example, many hosted network service providers commit to certain levels of uptime or availability for their services, and they would like to meet these levels even if under malicious network attacks. As another example, critical systems such as medical devices must respond to emergencies promptly, even under malicious network attacks. Therefore, it is important to test the security of a system and characterize its robustness against malicious attacks.

One way to test system security is to put the system under attack and analyze the behaviors of the system under attack to discover vulnerabilities. This process, which is known as "security analysis," can be performed using various methodologies. One methodology is to treat the device-under-analysis (DUA) as a black box. Under this methodology, the DUA is analyzed via the interfaces that it presents to the outside world (for example, by sending messages to the DUA). As a result, it is not necessary to access the source code or object code comprising the DUA.

Attacks can cause various failures in the DUA. Some of the failures are fatal (also known as hard failures) and disable the DUA. Some other failures are nonfatal (also known as soft failures). Soft failures do not immediately disable the DUA but may cause high CPU utilization, memory leaks, an increase in response times and/or temporary unresponsiveness. Soft failures often only affect the DUA internally and do not cause material behavioral changes of the DUA. Therefore, soft failures are hard to identify.

Nonetheless, soft failures can have substantial impacts on the robustness of the DUA. For example, they can deteriorate the system performance of a DUA slowly and eventually crash the DUA. Therefore, in order to measure the robustness of a DUA against malicious attacks, it is desirable to characterize (or quantify) the soft failures in the DUA caused by the attacks. Because the soft failures are mostly manifested internally and hard to identify, they are also hard to characterize.

Thus, there is a need for a system and method to identify and characterize soft failures of a DUA under attack.

SUMMARY

The present invention provides a system and method for identifying and characterizing nonfatal failures (soft failures) of a device-under-analysis (DUA). A security analyzer executes attacks to test the security of the DUA. During the attacks, the security analyzer periodically sends a pre-determined, well-formed message (the instrumentation message) to the DUA and measures the time required for the DUA to successfully respond to the instrumentation message (the response time). Since the instrumentation messages are sent periodically, the security analyzer is effectively sampling the response time of the DUA as the attack progresses. The security analyzer uses the measured response times (the response time samples) to identify and characterize (or quantify) the soft failures in the DUA caused by the attacks.

In one aspect of the invention, the security analyzer identifies soft failures by comparing the response time samples. This can be done in a number of ways. For example, if a response time exceeds a previous response time, the security analyzer may decide that the attacks exercised between the associated instrumentation messages caused a soft failure in the DUA. The security analyzer may characterize the soft failure by creating a time-series graph for the response time samples and determining trend lines for the graph. The security analyzer may also characterize the soft failures by calculating a Mu-Robustness-Index based on the fluctuation of the response time samples. The security analyzer may establish a baseline response time by sending the instrumentation message to the DUA when the DUA is operating normally (e.g., before attacking the DUA).

In another aspect of the invention, the security analyzer examines the responses of the DUA to the instrumentation message, in addition to or in place of analyzing the response time samples. If the DUA fails to respond to the instrumentation message within a period of time, the security analyzer may restart the DUA and repeat the previously exercised attacks. If the DUA responds with an error message indicating that it is busy, the security analyzer may freeze further attacks until the DUA successfully responds to the instrumentation message.

Other aspects of the invention include software, systems, components, and methods corresponding to the above, and applications of the above for other purposes.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

System Architecture

Figure 1:
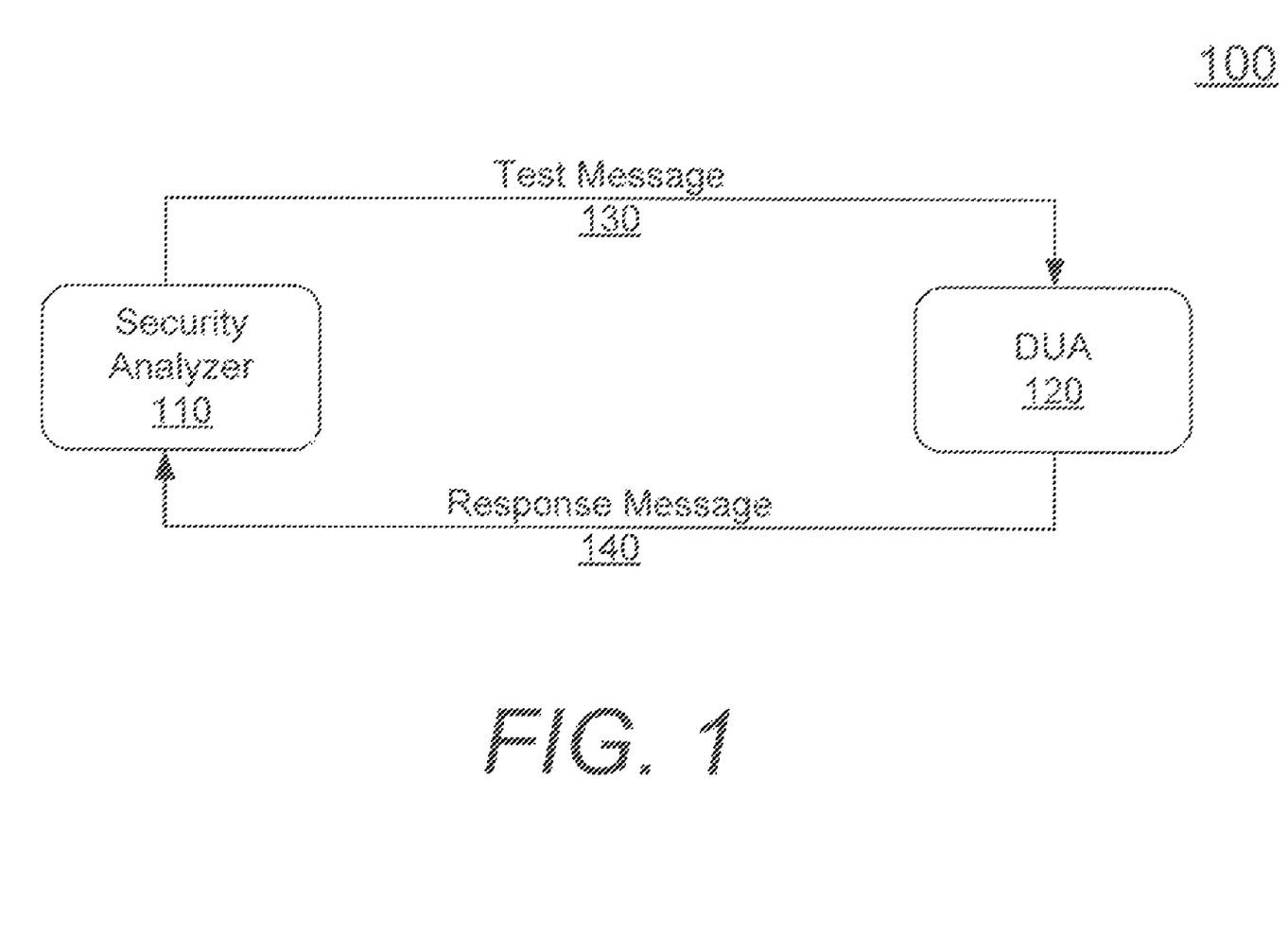
FIG. 1 illustrates a system to test a device-under-analysis (DUA) for soft failures, according to one embodiment of the invention.

FIG. 1 is a high-level block diagram of a system 100 for testing and/or analyzing the security (or implementation quality) of a device-under-analysis according to one embodiment of the present invention. The system 100 includes a security analyzer 110 and a device-under-analysis (DUA) 120. The security analyzer 110 and the DUA 120 can communicate through a channel (not shown in FIG. 1). The channel can use any type of data transmission mechanism, such as a network (wired or wireless). Examples of such a network include the Internet, an intranet, a wireless local area network (LAN), a cellular network, or any combination thereof. There can be devices located between the security analyzer 110 and the DUA 120 on the channel.

The security analyzer 110 is configured to test and/or analyze the security of the DUA 120. The security analyzer 110 can exercise attacks by sending (or transmitting) one or more test messages 130 to the DUA 120 and receiving one or more response messages 140 from it. The test messages 130 are designed to expose implementation flaws in the DUA 120. Detailed information and examples about the security analyzer 110 and security tests can be found in U.S. application Ser. No. 11/351,403, filed on Feb. 10, 2006, the content of which is incorporated by reference in its entirety.

The security analyzer 110 can be implemented in hardware, software, or a combination of both. Regarding software, the security analyzer 110 can be, for example, a single application (executing within a single operating system or single physical device) or a pair of applications (one to send the test messages 130 and one to receive the response messages 140; executing within the same device and communicating with each other to correlate sent and received messages). Regarding hardware, the security analyzer 110 can be, for example, a pair of physical devices (one to send the test messages 130 and one to receive the response messages 140) with out-of-band synchronization to correlate sent and received messages. In one embodiment, the security analyzer 110 is a portable appliance that can be transported to different locations to analyze the security of different devices.

The DUA 120 includes hardware and/or software subject to security analysis. Software includes, for example, applications, operating systems, and/or communications systems. Hardware includes, for example, one or more devices. A device can be, for example, a switch, bridge, router (including wireline or wireless), packet filter, firewall (including stateful or deep inspection), Virtual Private Network (VPN) concentrator, Network Address Translation (NAT)-enabled device, proxy (including asymmetric), intrusion detection/prevention system, or network protocol analyzer. The DUA 120 can be multiple devices that are communicatively coupled to form a system or network of devices. For example, the DUA 120 can be two firewall devices that establish an encrypted tunnel between themselves. The DUA 120 receives the test messages 130 from the security analyzer 110 and responds by sending the response messages 140.

In one embodiment, the security analyzer 110 and the DUA 120 are structured to include a processor, memory, storage, network interfaces, and applicable operating system and other functional software (e.g., network drivers, communication protocols).

Security Test and Analysis

The security analyzer 110 tests the security of the DUA 120 by sending 120 test messages to the DUA 120 and observing its responses. Each test message helps to analyze one or more aspects of the security of the DUA 120. Thus, in order to analyze the overall security of the DUA 120, it is necessary to attack the DUA 120 in different ways. In one embodiment, the test messages are in the form of mutations (malformed messages) on protocols. Since the DUA 120 tends to execute different code paths to deal with exceptional cases raised by the mutations, sending mutations to the DUA 120 typically exhaustively tests the behavior of the DUA 120 and reveals its vulnerabilities. Detailed information and examples about mutation generation can be found in U.S. application Ser. No. 11/514,809, filed on Sep. 1, 2006, the content of which is incorporated by reference in its entirety.

Test messages (or mutations) are organized into protocols, suites, variants and vectors. A protocol refers to an exchange of data or messages in a known, structured format. Types of protocols include, for example, networking protocols, application program interfaces (APIs), and file formats. A DUA 120 typically supports one or more protocols by implementing them. A test message is classified based on which protocol it targets. A protocol is divided into suites (also know as logical sections or test suites), and a test message is classified based on which suite it targets. A suite can represent, for example, a particular command, message type, or header field (e.g., the "authentication header" suite in HyperText Transfer Protocol (HTTP)). A suite is divided into variants (also know as test groups), and a test message is classified based on which variant it targets. A variant can represent, for example, a vulnerability category related to a particular command parameter or header field value (e.g., buffer overflow). A variant is divided into vectors (also known as test cases), each including one or more test messages that can explore the vulnerability of the variant.

In one embodiment, the security analyzer 110 treats the DUA 120 as a black box. Under this methodology, the DUA 120 is analyzed via the interfaces that it presents to the outside world. Analysis includes, for example, sending test messages to the DUA 120 and observing its responses. A response can include, for example, returning a response message. Based on the responses, the security analyzer 110 analyzes the security of the DUA 120.

Identification of Soft Failures

Sending test messages to the DUA 120 can cause various failures in it. Some of the failures are fatal (also known as hard failures), such as system crashes and total unresponsiveness. Some of the failures are nonfatal (also known as soft failures), such as resource exhaustion and memory leaks. Soft failures tend to manifest themselves in CPU utilization spikes, reduction of available memory, partial (or temporary) unresponsiveness, and/or a degradation in system performance. Soft failures may not directly cause material behavioral changes in the DUA 120 that are observable to the outside world, such as system crashes or total unresponsiveness.

The security analyzer 110 can identify hard failures by observing responses of the DUA 120 to test messages. For example, if the DUA 120 times out in responding to a test message, the security analyzer 110 can determine that the DUA 120 experienced a hard failure. However, because soft failures tend to manifest internally and do not cause material behavioral changes of the DUA 120, it is more difficult for a conventional security analyzer 110 to identify soft failures based on these responses.

In one embodiment, the security analyzer 110 identifies soft failures in the DUA 120 using an instrumentation message. The instrumentation message is a valid message sent by the security analyzer 110 to observe the response of the DUA 120. In one embodiment, the instrumentation message can be used to verify that both the DUA 120 and the security analyzer 110 are configured properly to the point the DUA 120 responds back with messages. Instead of one single instrumentation message, the security analyzer 110 can send a vector of messages (an instrumentation vector) to the DUA 120, causing multiple exchanges of messages between the security analyzer 110 and the DUA 120. For example, an instrumentation vector may include a message to request a connection and a message to disconnect, causing the DUA 120 to respond with a message to establish the connection and a message to confirm the disconnection. The security analyzer 110 can have one or more instrumentation messages (or instrumentation vectors) for a particular DUA 120. For example, each suite (or test suite) of test messages can have an instrumentation vector. Both the instrumentation message and the instrumentation vector are collectively called instrumentation command for clarity.

In one embodiment, the security analyzer 110 uses the time the DUA 120 takes to successfully respond to the instrumentation command (the response time) to identify soft failures in the DUA 120. The response time is the duration between the security analyzer 110 sending out the instrumentation command and receiving the complete response from the DUA 120 (e.g., when the security analyzer 110 receives the last byte of the last successful response message to the instrumentation command). In another embodiment, the security analyzer 110 uses response latency to identify soft failures in the DUA 120. The response latency is the duration between the security analyzer 110 sending the instrumentation command and receiving the first successful response from the DUA 120 (e.g., when the security analyzer 110 receives the first byte of the first successful response).

The security analyzer 110 sends the same instrumentation command to the DUA 120 multiple times using the same transmission mechanism. Each time the DUA 120 executes the same code path to respond to the instrumentation command. It follows that the response time to the instrumentation command should remain constant as long as the DUA 120 is operating normally. However, if soft failures occur in the DUA 120 and diminish its performance (e.g., by reducing available memory or spiking CPU utilization), the response time typically will increase. Therefore, by sending multiple copies of the instrumentation commands to the DUA 120 and repeatedly measuring its response times, the security analyzer 110 can identify soft failures in the DUA 120. Because the security analyzer 110 is effectively sampling the response time of the DUA 120, these measured response times are also called response time samples.

In one embodiment, the security analyzer 110 establishes a baseline response time by sending an instrumentation command to the DUA 120 when it is known to be functioning normally, and measuring the time it takes to respond. The baseline response time is a measure of the quiescent state of the DUA 120 when there are no other connections and/or requests present and the DUA 120 is not under attack. Because the instrumentation command comprises one or more valid messages, the baseline response time only measures a valid transaction in the DUA 120.

The security analyzer 110 interleaves attacks (sending mutation messages or other types of test messages) to the DUA 120 with sending the instrumentation command to it. For example, the security analyzer 110 can periodically send the instrumentation command while primarily sending test messages to the DUA 120. For example, the security analyzer 110 might send one instrumentation command per second, per every sixteen vectors of test messages, or whichever occurs first. As another example, the security analyzer 110 may send one instrumentation command per test suite, per test variant (or test group), and/or per test vector (or test case). In one embodiment, the frequency of sending the instrumentation command can be reduced (longer period between the instrumentation commands) to reduce the load on the DUA 120, or increased (shorter period between the instrumentation commands) to reduce opportunities for the DUA to go into quiescent state. Therefore, the instrumentation command serves as a "heart beat," enabling the security analyzer 110 to periodically measure response time over the course of the security test. As described above, the response time samples are measured using the exact same instrumentation command, and therefore reflect the internal workings of the DUA 120. By analyzing the fluctuation of the response time samples, the security analyzer 110 can deduce the overall behavior of the DUA 120 and identify soft failures. The security analyzer 110 can further deduce that the identified soft failures are caused by the attacks.

The security analyzer 110 can determine whether the identified failures are repeatable. After identifying the failures, the security analyzer 110 may restart the DUA 120 and repeat the attacks. Alternatively, the security analyzer 110 can choose to only repeat those attacks submitted after the most recent instrumentation command that is successfully responded to, and/or continue with the remaining security test and/or analysis.

The security analyzer 110 may withhold further attacks if the response to the instrumentation command includes error messages that indicate that the DUA 120 is busy. The security analyzer 110 may continue to send the instrumentation command until the DUA 120 successfully responds to it. Examples of the error messages include a Voice over Internet Protocol (VoIP) message indicating that the VoIP server cannot accept any more phone calls, and a File Transfer Protocol (FTP) message indicating that the FTP server has too many connections open.

Characterization of Soft Failures

In one embodiment, the security analyzer 110 characterizes (or quantifies) the soft failures in the DUA 120 by quantifying the distribution of response time samples measured during the security test. The distribution can be quantified in many ways. For example, it can be described by calculating the mean and standard deviation for the set of response time samples. Alternately, the entire distribution can be displayed as a curve, such as a cumulative distribution function that graphs responses time samples below a certain level. Because the response time reflects the internal workings of the DUA 120, the fluctuation of the response time samples can be used to measure the robustness of the DUA 120 against malicious attacks.

In one embodiment, the distribution of response time samples is described by a Mu-Robustness-Index (MRI), which is expressed as:

$$\text{Mu-Robustness-Index} = \text{\% Response Time Samples within Tolerance of Mean}$$

Therefore, the MRI is the percentage of response time samples falling within a given Tolerance value around the average of all response time samples (the mean). The Tolerance value is typically expressed as a percentage of the mean.

The MRI categorizes the soft failures caused by malicious attacks and the robustness of the DUA 120 against these attacks. Given a specific Tolerance value, a higher MRI value (i.e., higher % Response Time Sample) means the associated DUA 120 is more robust against that particular attack (because a higher percentage of responses fell within the given Tolerance value, so there was less variability in response time samples). As described above, soft failures deteriorate the performance of the DUA 120. Therefore, if the attacks cause more (or more severe) soft failures, this means the DUA 120 is less robust against these attacks. More (or more severe) soft failures in the DUA 120 also typically result in higher deviations of the response time samples from the mean. Therefore, a robust device (or system) typically will have lower deviations in response time samples, meaning a higher MRI value. If the Tolerance is held constant, then higher % Response Time Sample will cause a higher MRI value. If the % Response Time Sample is held constant, then lower Tolerance will cause a higher MRI value. The value of a MRI or a Tolerance is higher if the value increases. Depending on the application, MRI values may be compared on the basis of constant % Response Time Sample, constant Tolerance value, or some combination of the two.

Based on the criticality of the DUA 120, the end users can select different values for the Tolerance to obtain corresponding MRI values. If the quality of service requirements for the DUA 120 are loose, the Tolerance might be set at a relatively high value (i.e., loose tolerance). As a result, the DUA 120 will have a high MRI value (i.e., high % Response Time Samples) even if the response time samples fluctuate quite substantially. If the requirements for stable performance are strict, the Tolerance value can be set relatively low. As a result, the DUA 120 will have a low MRI (i.e., low % Response Time Samples) unless the response time samples are relatively stable. Therefore, the robustness of the DUA 120 can be characterized by the MRI given an associated Tolerance (expressed as % Response Time Samples/specified Tolerance). For example, an ideal device with constant response time samples would have an MRI of 100/0, indicating that there is zero fluctuation in response time samples, there are no soft failures, and the robustness of the device is perfect (at least in this respect).

Using the MRI to characterize the robustness of a system is simple and clear. For example, assume the security analyzer 110 calculates that a first DUA has an MRI of 70/5 and a second DUA has an MRI of 95/5. The end user can immediately determine that the second DUA is more stable than the first one, because 95% of the response time samples are within the 5% range of the mean for the second DUA, while only 70% of the response time samples fall within the same range for the first DUA.

The MRI does not characterize the DUA 120's absolute performance. No matter how powerful the CPU of the DUA 120 is or how much memory the DUA 120 has, if it is robust against attacks, this should be reflected in a high MRI value. This is because the MRI is determined by the percentage deviation of the response time samples from their mean, not by their absolute values.

In another embodiment, rather than calculating the deviation of the response time samples from their mean, a different quantitative robustness index may be calculated based on their deviation from the baseline response time. In yet another embodiment, a robustness index can be calculated based on the standard deviation of the response time samples.

The security analyzer 110 can also create a time-series graph for the response time samples measured over the course of the security test. A time-series graph is a line graph where time is measured on one axis (typically, the horizontal axis) and the variable (in the current case response time) being observed is measured on the other axis. The security analyzer 110 may also determine trend lines for the graph. By analyzing the trend lines and the fluctuation of the response time samples on the graph, degradation of performance of the DUA 120 during the attacks and deviations of response time samples from the trend lines can be identified. Thus, soft failures caused by the attacks can be characterized and the robustness of the DUA 120 against the attacks can be determined.

Figure 3:
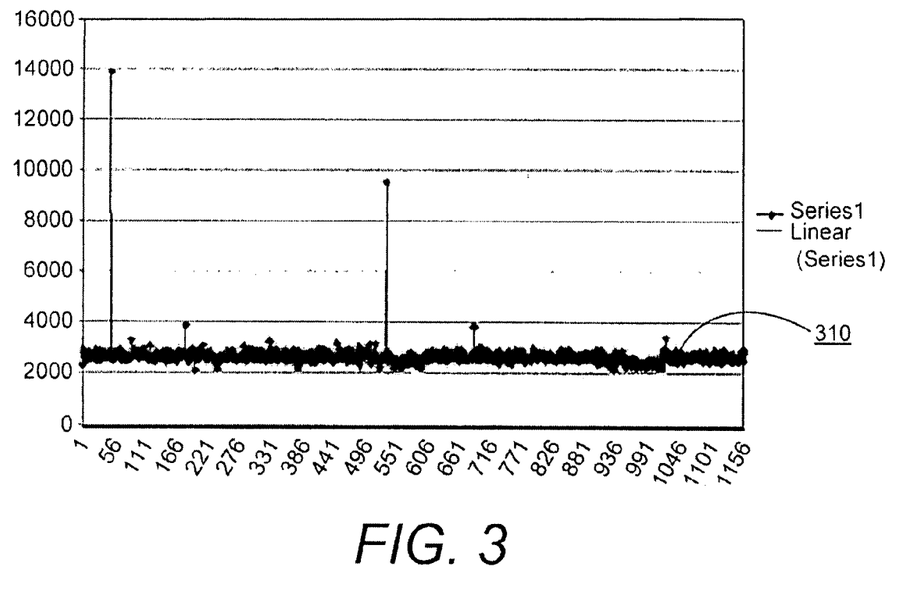
FIGS. 3 and 4 illustrate two examples of time-series graphs for characterizing nonfatal failures, according to one embodiment of the invention.

One example of the time-series graph is illustrated in FIG. 3. FIG. 3 is a time-series graph for the response time samples of a target system measured over the course of a security test. The graph has a linear trend line 310 (i.e., best fit line) indicating the direction of the response time. The graph indicates that the target system is generally stable since the linear trend line 310 is basically flat. Notice that the response time samples of the target system do not fluctuate too much around the mean (with two exceptions) and the system has no degradation as indicated by the flat trend line 310.

Figure 4:
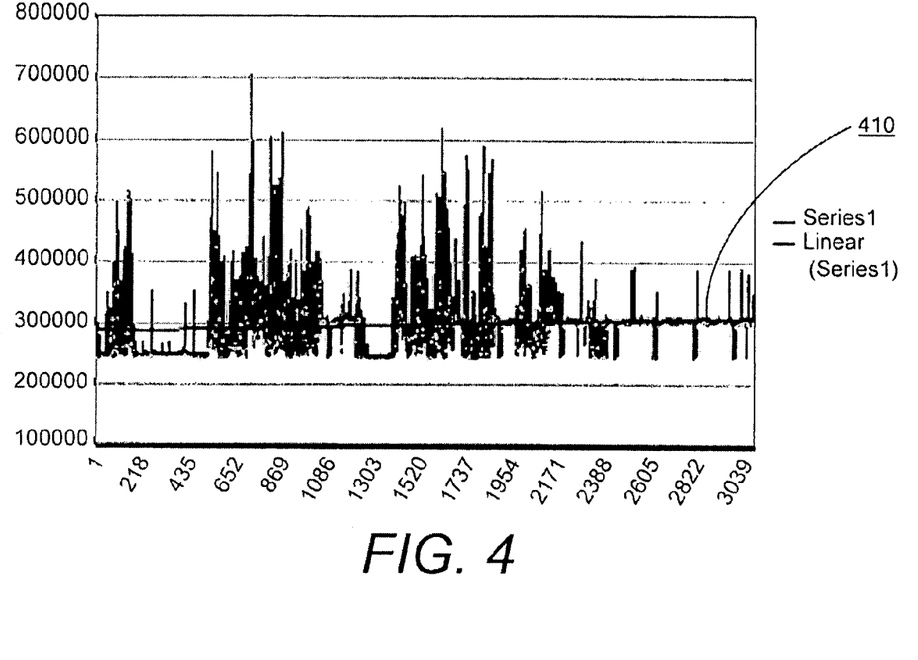

Another example of the time-series graph is illustrated in FIG. 4. FIG. 4 is a time-series graph for the response time samples of a second target system. The response time samples are slowly increasing as indicated by the slowly rising trend line 410. Therefore, it can be deduced that the attacks cause soft failures in the second target system, the performance of the system degrades over time, and the attacks may ultimately cause a hard catastrophic failure in the system. Also notice that the response time samples fluctuate from the trend line 410 substantially, indicating that the exceptional conditions caused by the attacks are not handled with grace. As a result, it can be concluded that the target system associated with FIG. 3 is more robust to attacks and experiences less (or less severe) soft failures than the second target system of FIG. 4.

In one embodiment, the security analyzer 110 can retrieve status information (e.g., memory usage meter, CPU usage meter) from the DUA 120. For example, the security analyzer 110 can send request messages to the DUA 120, asking it to provide such information. The instrumentation command can include such a request message. Alternatively, this information can be retrieved through a test harness connected to the DUA 120 through an interface of the DUA 120 (e.g., a diagnostic interface in a development-stage device). The security analyzer 110 can establish a baseline status of the DUA 120 by retrieving such status information when the DUA 120 is operating normally. The retrieved status information can be used to calculate the MRI and/or be displayed on the time-series graphs. Most systems support Simple Network Management Protocol (SNMP) which can be used to obtain internal counters like CPU utilization, packet drop rates, memory usage and so on. The security analyzer 110 may also probe these counters in order to build the time-series graphs.

Example Process

Figure 2:
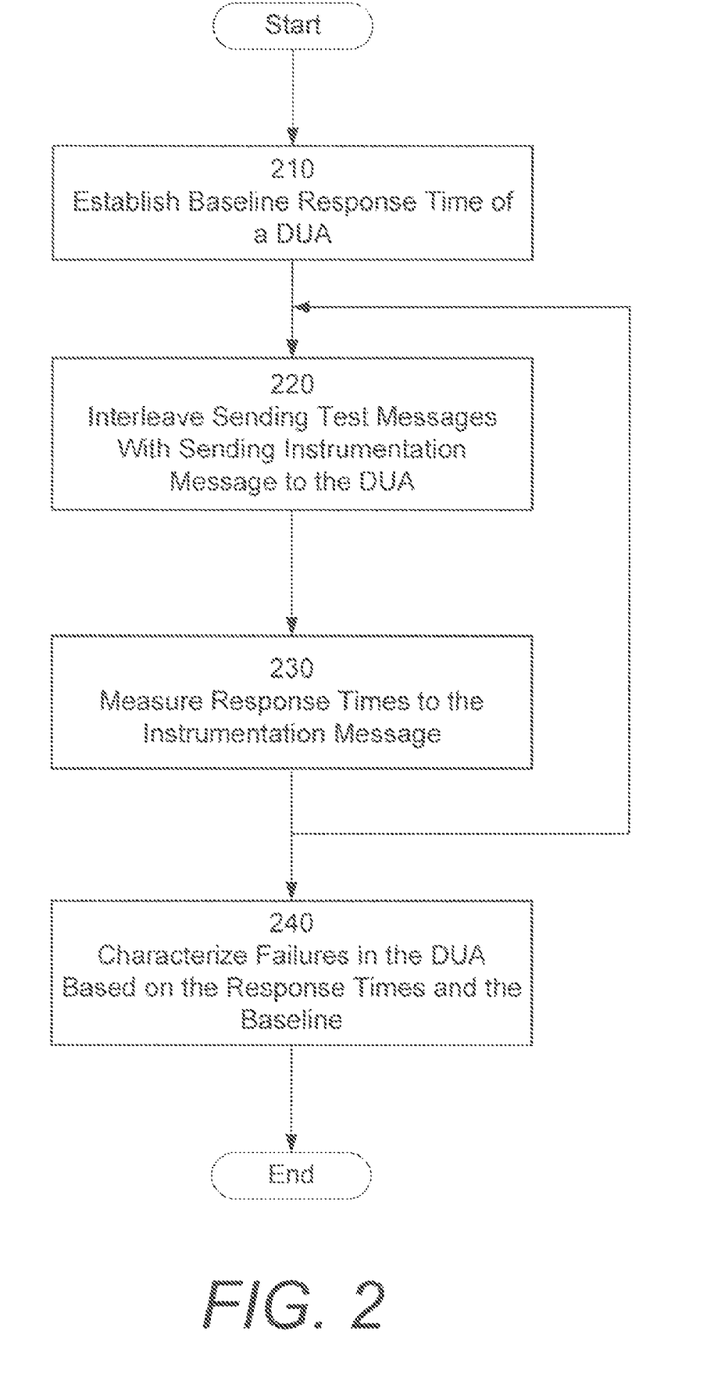
FIG. 2 illustrates a flow diagram of a method for testing the security of a DUA for soft failures, according to one embodiment of the invention.

FIG. 2 is a flowchart of an exemplary operation of the security analyzer 110 in accordance with one embodiment of the invention. In this example, the security analyzer 110 operates to test the security of the DUA 120 and determine its robustness against attacks.

The security analyzer 110 establishes 210 a baseline response time by sending an instrumentation command to the DUA 120 when it is not under attack. The security analyzer 110 measures the time between it sending the instrumentation command and receiving successful response message(s) from the DUA 120 and uses this as the baseline response time.

The security analyzer 110 interleaves 220 sending test messages to the DUA 120 with sending the instrumentation command to it, and measures 230 the response time of the DUA 120 to the instrumentation command (the response time sample). As described above, the test messages are sent to the DUA 120 to forces the DUA 120 to execute different code paths and handle exceptional conditions. Consequently, if the DUA 120 is not implemented properly, the test messages will cause failures in the DUA 120. The security analyzer 110 sends the same instrumentation command repeatedly, causing the DUA 120 to execute the same code path to respond. Therefore, the response time sample reflects performance degradation of the DUA 120 caused by the failures.

The security analyzer 110 characterizes 240 the failures in the DUA 120 caused by the test messages based on the measured response time samples. As described above, the security analyzer 110 can generate a time-series graph plotting the response time samples measured over the course of the security test, and/or calculate a MRI value based on the measured response time samples and a given tolerance value. Both the time-series graph and the MRI characterize the failures of the DUA 120, thereby reflect its robustness against malicious attacks.

Additional Embodiments

In one embodiment, the security analyzer 110 is implemented in multiple hardware and/or software. For example, one software application or hardware device is configured for sending test messages and instrumentation commands, another is configured for receiving response messages, and a third one for measuring response time samples to the instrumentation commands.

In one embodiment, the security analyzer 110 can analyze the security of a network. For example, the security analyzer 110 can send test messages and instrumentation commands to the target network, requesting it to route the test messages and/or instrumentation commands back to the security analyzer. The security analyzer 110 can then respond to the test messages and/or instrumentation commands by sending response messages to itself through the target network. The security analyzer 110 can measure the times the network takes to route the test messages, the instrumentation commands, and/or the response messages and characterize the robustness of the network using these times.

In the preceding description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

What is claimed is:

1. A method for characterizing system security of a device under analysis (DUA), comprising:
   sending a plurality of test messages to attack the DUA;
   sending a plurality of instrumentation commands to the DUA, the sending of the plurality of instrumentation commands interleaved with the sending of the plurality of test messages;
   measuring response times for the DUA to successfully respond to each of the plurality of instrumentation commands;
   responsive to observing no response from the DUA to one of the plurality of instrumentation commands for a predetermined period of time:
      restarting the DUA, and
      resending test messages sent to the DUA prior to sending the one of the plurality of instrumentation commands that receives no response;
   responsive to the DUA sending a message indicating system busy in response to a second one of the plurality of instrumentation commands, resending the second one of the plurality of instrumentation commands to the DUA; and
   characterizing the system security based, at least in part, on the measured response times.

2. The method of claim 1, wherein measuring the response times comprises:
   for each instrumentation command sent to the DUA, measuring the time between when the instrumentation command is sent and when a successful response from the DUA is received.

3. The method of claim 2, wherein the time when a successful response from the DUA is received comprises a time when the successful response is completely received.

4. The method of claim 1, wherein characterizing the system security based on the measured response times comprises:
   identifying a potential presence of a soft failure in the DUA caused by at least one of the plurality of test messages by comparing the measured response times for different ones of the plurality of instrumentation commands.

5. The method of claim 1, further comprising:
establishing a baseline response time for the DUA to successfully respond to at least one of the plurality of instrumentation commands while not under attack, wherein characterizing the system security is further based on comparison of the measured response times for different ones of the plurality of instrumentation commands with the baseline response time.

6. The method of claim 1, wherein characterizing the system security comprises:
calculating a robustness index that quantifies the distribution of the measured response times.

7. The method of claim 6, wherein characterizing the system security comprises calculating a robustness index indicating what fraction of response times falls within a given tolerance of the mean of the measured response times.

8. The method of claim 6, wherein calculating a robustness index comprises calculating the robustness index based on a standard deviation of the measured response times.

9. The method of claim 1, wherein characterizing the system security comprises determining a time-series graph for the measured response times.

10. The method of claim 1, wherein sending the plurality of instrumentation commands to the DUA comprises sending the plurality of instrumentation commands to the DUA at least one of: a fixed time interval, between a fixed number of test messages, between test suites, between test variants, or between a fixed number of test vectors.

11. The method of claim 2, wherein the time when a successful response from the DUA is received comprises a start time when the successful response is starting to be received.

12. The method of claim 1, wherein the plurality of test messages are malformed test messages.

13. The method of claim 12, wherein the malformed test messages are generated by mutation of normal messages.

14. A security analyzer for characterizing system security of a device under analysis (DUA), comprising:
means for sending a plurality of test messages to attack the DUA;
means for sending a plurality of instrumentation commands to the DUA, the sending of the plurality of instrumentation commands interleaved with the sending of the plurality of test messages;
means for measuring response times for the DUA to successfully respond to each of the plurality of instrumentation commands;
means, responsive to observing no response from the DUA to one of the plurality of instrumentation commands for a predetermined period of time, for
restarting the DUA, and
resending test messages sent to the DUA prior to sending the one of the plurality of instrumentation commands that receives no response;
means, responsive to the DUA sending a message indicating system busy in response to a second one of the plurality of instrumentation commands, for resending the second one of the plurality of instrumentation commands to the DUA; and
means for characterizing the system security based, at least in part, on the measured response times.

15. The security analyzer of claim 14, wherein the test messages are malformed test messages.

16. The security analyzer of claim 15, wherein the malformed test messages are generated by mutation of normal messages.

17. A computer program product for use in conjunction with a computer system, the computer program product comprising a non-transitory computer readable storage medium and a computer program mechanism embedded therein, the computer program mechanism comprising:
instructions for sending a plurality of test messages to attack a DUA;
instructions for sending a plurality of instrumentation commands to the DUA, the sending of the plurality of instrumentation commands interleaved with the sending of the plurality of test messages;
instructions for measuring response times for the DUA to successfully respond to each of the plurality of instrumentation commands;
instructions for, responsive to observing no response from the DUA to one of the plurality of instrumentation commands for a predetermined period of time:
restarting the DUA, and
resending test messages sent to the DUA prior to sending the one of the plurality of instrumentation commands that receives no response;
instructions for, responsive to the DUA sending a message indicating system busy in response to a second one of the plurality of instrumentation commands, resending the second one of the plurality of instrumentation commands to the DUA; and
instructions for characterizing the system security based, at least in part, on the measured response times.

18. The computer program product of claim 17, wherein measuring the response times comprises:
for each instrumentation command sent to the DUA, measuring the time between when the instrumentation command is sent and when a successful response from the DUA is received.

19. The computer program product of claim 18, wherein when a successful response from the DUA is received comprises the time when a successful response from the DUA is received comprises a time when the successful response is completely received.

20. The computer program product of claim 17, wherein characterizing the system security based on the measured response times comprises:
identifying a potential presence of a soft failure in the DUA caused by at least one of the plurality of test messages by comparing the measured response times for different ones of the plurality of instrumentation commands.

21. The computer program product of claim 17, wherein the computer program mechanism further comprises:
instructions for establishing a baseline response time for the DUA to successfully respond to at least one of the plurality of instrumentation commands while not under attack, wherein characterizing the system security is further based on comparison of the measured response times for different ones of the plurality of instrumentation commands with the baseline response time.

22. The computer program product of claim 17, wherein characterizing the system security comprises:
calculating a robustness index that quantifies the distribution of the measured response times.

23. The computer program product of claim 22, wherein characterizing the system security comprises calculating a robustness index indicating what fraction of response times falls within a given tolerance of the mean of the measured response times.

24. The computer program product of claim 18, wherein when a successful response from the DUA is received comprises the time when a successful response from the DUA is received comprises a start time when the successful response is starting to be received.

25. The computer program product of claim 17, wherein sending the plurality of instrumentation commands to the DUA comprises sending the plurality of instrumentation commands to the DUA at least one of: a fixed time interval, between a fixed number of test messages, between test suites, between test variants, or between a fixed number of test vectors.

26. The computer program product of claim 17, wherein the plurality of test messages are malformed test messages.

27. The computer program product of claim 26, wherein the malformed test messages are generated by mutation of normal messages.

* * * * *